United States Patent [19]

Siden et al.

[11] 3,945,114

[45] Mar. 23, 1976

[54] METHOD FOR THE SIMULTANEOUS TERMINATION IN TERMINAL SLEEVES OF A PLURALITY OF WIRES WITH A MULTI-PIN CONNECTOR

[75] Inventors: Dennis Carl Siden, Portolla Valley; Corey John McMills, Los Altos, both of Calif.

[73] Assignee: Raychem Corporation, Menlo Park, Calif.

[22] Filed: Feb. 14, 1974

[21] Appl. No.: 442,580

[52] U.S. Cl. .................... 29/628; 174/112; 228/179

[51] Int. Cl.² .......................................... H02G 15/08

[58] Field of Search ...... 29/629, 628, 630 R, 630 B, 29/471.1; 174/112; 228/179

[56] References Cited

UNITED STATES PATENTS

| | | | |
|---|---|---|---|
| 3,459,878 | 8/1969 | Gressitt et al. | 174/112 |
| 3,525,799 | 8/1970 | Ellis | 29/628 |

*Primary Examiner*—Al Lawrence Smith
*Assistant Examiner*—Robert C. Watson
*Attorney, Agent, or Firm*—Lyon and Lyon

[57] ABSTRACT

A procedure for accomplishing the conditioning and placement of a plurality of wires for the simultaneous termination of the wires of a multi-pin connector. Terminal sleeves are employed to both position and lock the several wires to the multi-pin connector. The sleeves are held fixed relative to one another in an identification block and wires are threaded therethrough. When positioned, the wires are held by a wire clamp cooperating with the identification block. Simultaneous cutting and stripping of the wires may then be performed in preparation for termination with a multi-pin connector. Once prepared, the wires are positioned adjacent a row of pins on the multi-pin connector and the identification block with the sleeves enclosed is forced toward the prepared ends of the wires and onto the connector pins. This sliding of the sleeves over the ends of the wires and onto the connector pins easily and quickly completes the positioning of the wires relative to the connector pins to insure the proper termination of each individual wire. By fixing the wire clamp relative to the multi-pin connector, the wires will be held relative to the multi-pin connector during the sliding of the sleeves onto the connector pins.

12 Claims, 7 Drawing Figures

FIG. 1.
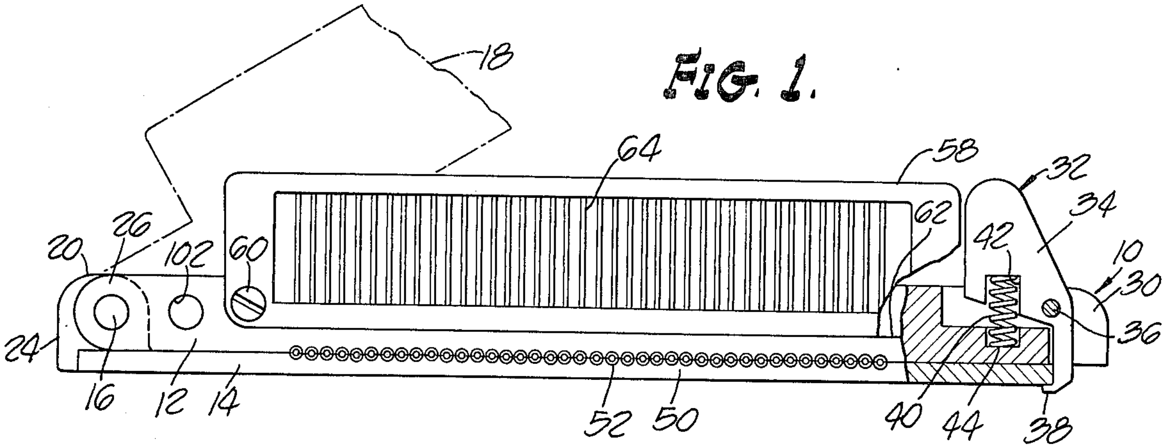
FIG. 2.
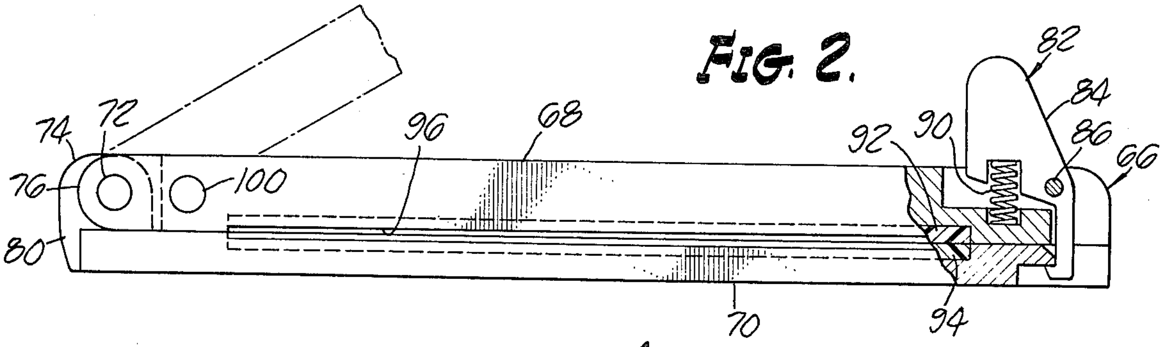
FIG. 3.
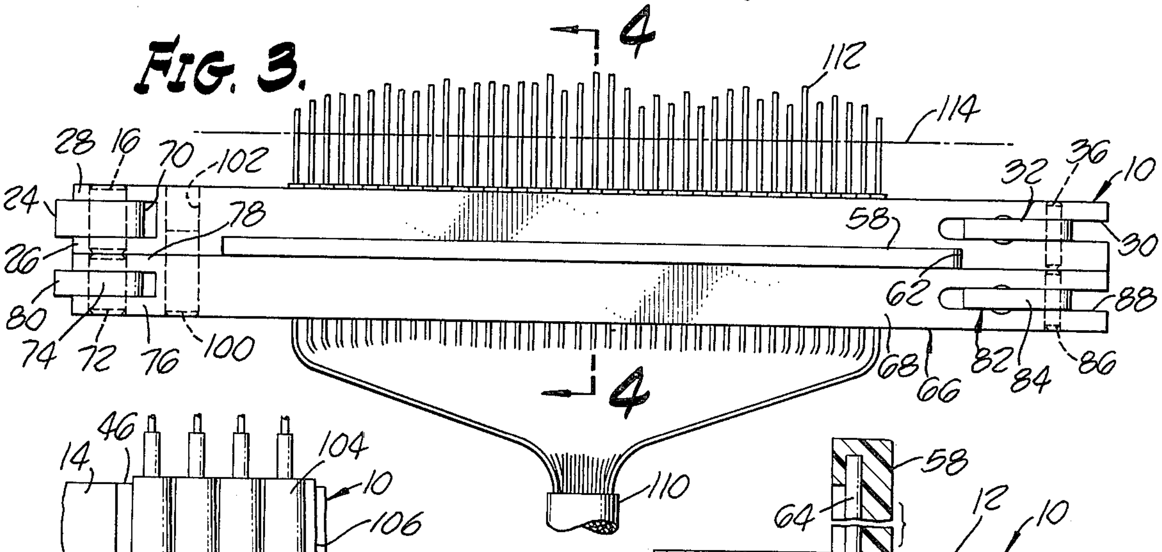
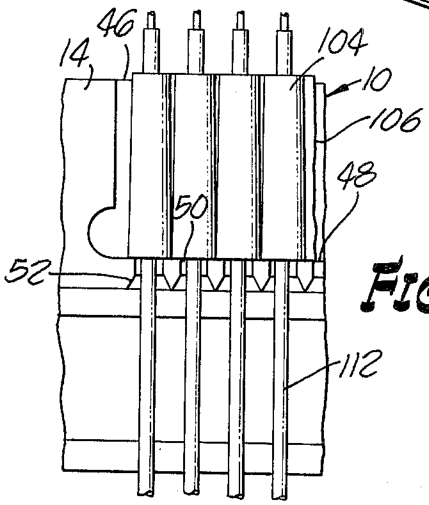
FIG. 5.
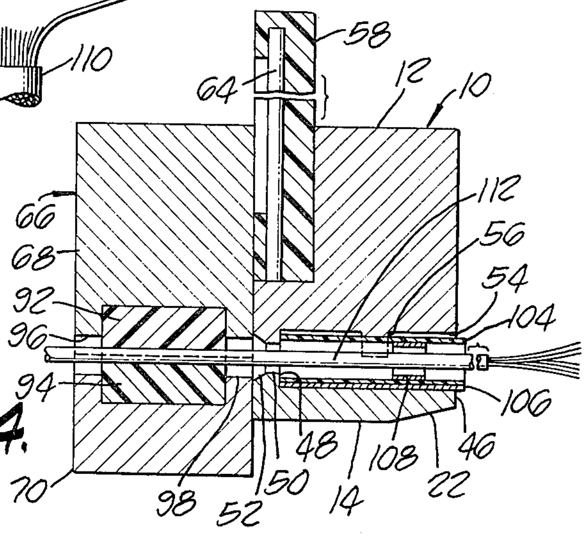
FIG. 4.

METHOD FOR THE SIMULTANEOUS TERMINATION IN TERMINAL SLEEVES OF A PLURALITY OF WIRES WITH A MULTI-PIN CONNECTOR

This invention relates to the process and apparatus whereby a plurality of wires may be handled simultaneously for the termination of the wires to a multi-pin connector.

One of the principle problems associated with the fabrication of any wiring system of substantial complexity is the necessity for the termination of individual wires to connectors and other similar electrical components. Naturally, when each wire must be individually soldered to the appropriate terminal pin, the labor costs associated with the fabrication of the electrical system becomes of major importance. Further, the individual soldering operations can often result in mistakes and defective terminations simply because of the magnitude of individual operations involved. The proper placement of each wire relative to the appropriate pin, the exact location of the solder bead and the prevention of electrical paths between adjacent wires and pins are important requirements for each wire termination. It is further advantageous to have terminal sleeves associated with each terminal connection for strength, insulation, protection and uniformity of the connection. All of these conditions preferably should be met for each terminal created. Thus, each wire termination must be accurately and yet rapidly performed in order that a competitve and reliable system may be created.

The present invention insures the accurate and simultaneous preparation of a plurality of wires and provides for the exact positioning of each individual wire with its proper terminal pin. Further, the system provides for the use of individual terminal sleeves about each wire termination. This accurate and simultaneous procedure for the termination of a plurality of wires with a multi-pin connector or other electrical component helps reduce the labor costs, assembly time, possibility of errors during assembly, and possiblity of defective terminations. Further, terminal sleeves can be employed without causing fraying and buckling of the wire ends during the positioning of the wires within the sleeves.

More specifically, the invention involves the positioning of a plurality of terminal sleeves for the receipt of individual wires before these wires are cut to the appropriate length and stripped. Once the wires are positioned within the sleeves, they may be simultaneously or individually cut and stripped in preparation for termination with a multi-pin connector. When the terminal ends of the individual wires have been prepared, the wires and sleeves may be transported together to a position adjacent the multi-pin connector. The sleeves are then wiped over the terminal ends of the wires and moved onto the connector pins in a single motion. In this sliding process, the filaments of each stripped wire are drawn together within the sleeve and held with the appropriate pin. The sleeves may be heat shrinkable and each contain a solder bead. Such terminal sleeves are disclosed in the Wetmore United States Letters Patent No. 3,243,211, incorporated herein by reference. Thus, soldered and insulated terminations may be created.

To accomplish this simultaneous handling of a large number of wires, an identification block is provided to assist the selective positioning of each wire for later alignment with a multi-pin connector. The identification block is adapted to accept and retain terminal sleeves through which the wires may pass. Once the wires are positioned, they may be cut to length, stripped of a length of insulation and positioned adjacent the appropriate connector pins. An entire set of wires can be simultaneously subjected to these steps because of the prior positioning of the wires in the identification block. Further, the identification block can be used to simultaneously slide the plurality of terminal sleeves along the wires to the cut and stripped ends thereof and over the connector pins of the multi-pin connector. A wire clamp is also included to work in conjunction with the identification block to resist longitudinal movement of the wires through the identificaton block in one direction and to promote relative longitudinal movement of the wires through the identificaton block in the other direction.

Accordingly, it is an object of the present invention to provide a method for processing in a single series of steps a plurality of wires for termination with a multi-pin connector.

It is another object of the present invention to provide a method whereby terminal sleeves are employed simultaneously to locate a plurality of wires on connector pins to provide reliable termination thereof.

Thus, an improved method for the termination of a plurality of wires at a multi-pin connector is disclosed. Further objects and advantages of the present invention will be made readily apparent from the following detailed description and accompanying drawings.

FIG. 1 is a front elevation of an identification block of the present invention.

FIG. 2 is a front elevation of a wire clamp of the present invention.

FIG. 3 is a top view of the identification block and wire clamp of FIGS. 1 and 2, assembled together with a plurality of wires positioned therein.

FIG. 4 is a cross-sectional side view taken along line 4—4 of FIG. 3.

FIG. 5 is a plan view of the identification block of FIG. 1 with terminal sleeves and wires in place and with the upper member thereof removed.

Figure 6:
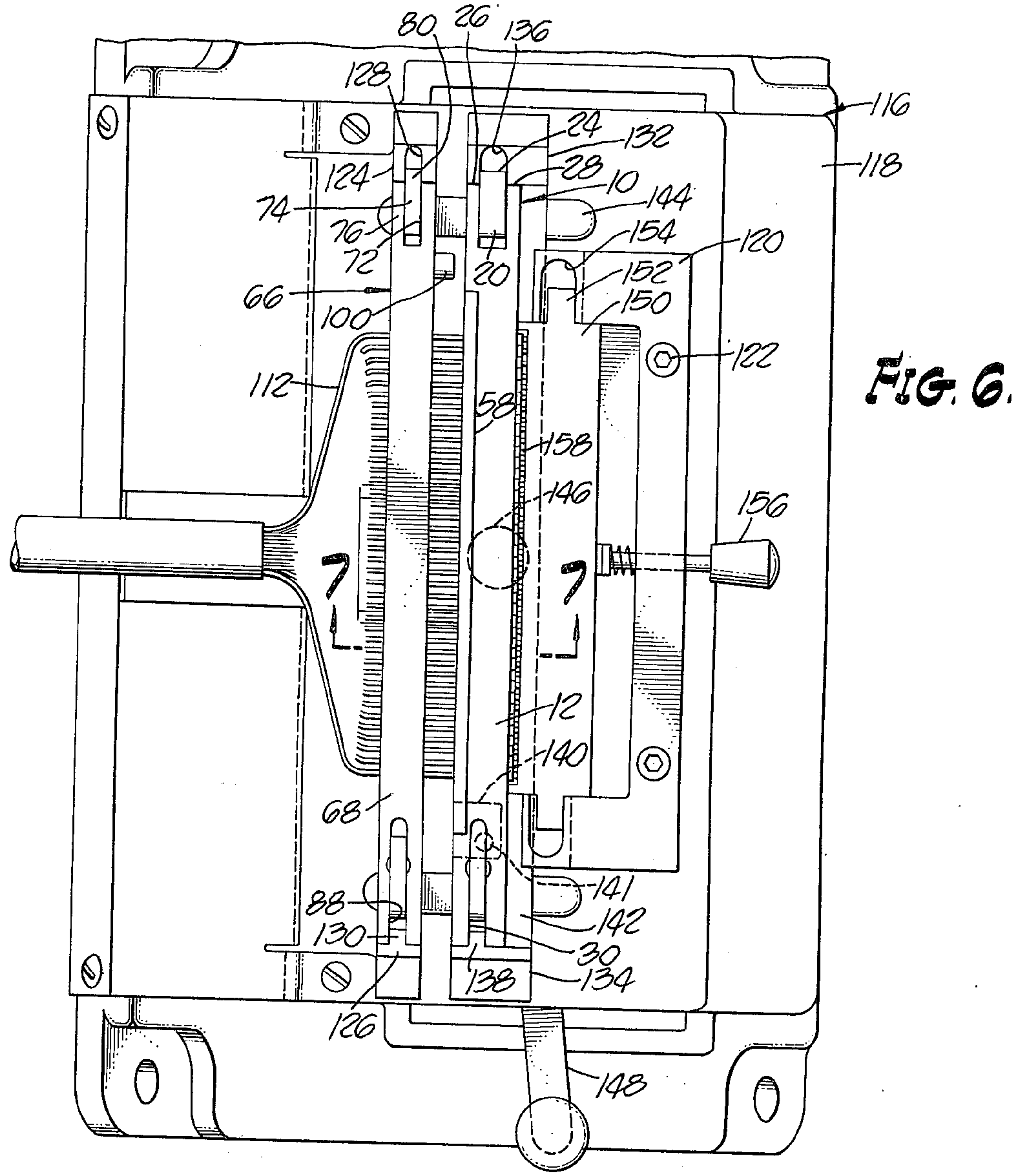
FIG 6 is a plan view of a holder employed to position the identification block of FIG. 1 and clamp of FIG. 2 for the automated sliding of the terminal sleeves onto a multi-pin connector.

Turning specifically to the drawings, and specifically to FIG. 1, an identification block, generally designated 10, is disclosed. The identification block 10 includes an upper elongated member 12 and a lower elongated member 14 hinged together about a pin 16. In FIG. 1, the identification block 10 is shown in the closed position. The upper elongated member 12 is illustrated in the open position by phantom lines 18. The lower elongated member 14 is a relatively thin, substantially rectangular bar having a lug 20 extending upwardly therefrom to accommodate the pin 16. The lower surface of the lower member 14 is slightly beveled at 22 as best seen in FIG. 4 to facilitate the positioning of the identification block 10 into a wire cutter or stripper such as illustrated in the Meadows application entitled Wire Cutter-Stripper, Serial No. 442,398, filed February 14, 1974, filed concurrently herewith and assigned to the assignee of the present application, the disclosure of which is incorporated herein by reference. The lug 20 extends laterally beyond the end of the lower member 14 to form a locating tongue 24.

The upper elongated member 12 is also a substantially rectangular block having clevis lugs 26 and 28 extending to cooperate with pin 16. The lug 20 associated with the lower member 14 is sized to fit between the clevis lugs 26 and 28 to form the hinge between the upper member 12 and the lower member 14. At the other end of the upper member 12, a notch 30 is provided centrally within the upper member 12 to receive a latching assembly, generally designated 32. Thus, means for joining the upper and lower elongated members 12 and 14 are provided. The notch 30 extends beyond the latching assembly 32 to form a groove capable of receiving a locating tongue.

The latching assembly 32 includes a latch 34 pivotally mounted to a pin 36 extending across the notch 30 through the upper member 12. The pin 36 allows pivotal motion of the latch 34 in order that a hook 38, formed on the lower end of the latch 34, might engage the lower member 14. A spring 40, sized to fit within the slot 30 biases the latch 36 toward the closed position. The spring 40 extends through the notch 42 to a hole 44 provided in the upper member 12. The latch 34 extends upwardly from the notch 30 to accommodate manual actuation of the latching assembly 32.

The mating surfaces of the upper and lower members 12 and 14 are generally planer and are in juxtaposition when the identification block 10 is closed. Provided in each mating surface is a recess. The recesses are aligned and operate together to form a cavity for receiving and holding terminal sleeves. The recess configurations are best seen in FIGS. 4 and 5. In the lower member 14, a rectangular recess 46 extends across the wire receiving portion of the lower member 14 and is open to the rear of the lower member 14. The terminal sleeves simply rest within this rectangular recess 46 as best seen in FIG. 5. The terminal sleeves are prevented from moving forward relative to the identification block 10 by the frontwall 48 of the rectangular recess 46. Semicircular channels 50 extend forward from the front wall 48 of the rectangular recess 46 to the front surface of the lower member 14. The semicircular channels 50 receive wires inserted through the identification block 10 as will be described below. The channels 50 are flared at 52 to facilitate the entry of the wires into the channels 50.

The upper rectangular recess 54 is substantially identical to the lower rectangular recess 46. However, a scalloped ridge 56 extends from the surface of the upper rectangular recess 54. The scalloped ridge 56 includes arcuate, concaved surfaces extending in series across the upper rectangular recess 54. These arcuate surfaces receive the several terminal sleeves to accurately position the sleeves laterally within the total cavity formed by the upper and lower recesses thereby providing means for positioning terminal sleeves in the cavity. The size of the recesses 46 and 54, the number of channels 50 and the number, size and spacing of the arcuate surfaces of the scalloped ridge 56 are designed with the multi-pin connectors in mind. As will be seen below, the terminal sleeves are to be positioned so that they may be inserted simultaneously onto a row of connector pins without individual realignment of the terminal sleeves.

A wire identification card 58 preferably of an inexpensive and easily machined plastic material is positioned on the front of the upper member 12 as seen in FIGS. 1 and 4. The wire identification card 58 is inset into the upper member 12 in order that it will not extend forward beyond the front surface of the identification block 10. The wire identification card 58 is simply and removably fastened to the upper member 12 by conventional fastening means 60. A recess 62 may conveniently be provided in the face of the wire identification card 58 in which color coded wires 64 are positioned. Holes extending through the lower portion of the identification card 58 receive the color coded wires 64. Corresponding holes are provided partially through the upper portion of the identification card 58 to similarly receive the opposite ends of the color coded wires 64. In this way, various indexing patterns may be provided using the same identification block 10. The card 58 can be easily removed from the identification block 10 and the wires either replaced or a new previously assembled identification card 58 substituted therefor. The positioning of the color coded wires 64 is such that each correspond to a circular passageway formed by mating channels 50 located in both the upper and lower members 12 and 14. It remains for the operator to simply match the color coding of the wires 64 when threading an identification block.

A wire clamp, generally designated 66 is illustrated in FIG. 2. The wire clamp 66 is constructed in a fashion similar to that of the identification block 10. An upper jaw 68 and a lower jaw 70 are hinged at pin 72. The upper jaw 68 is shown open in phantom in FIG. 2. A lug 74 extends upwardly from the lower jaw 70 to cooperate with clevis lugs 76 and 78 about pin 72 to form a hinge. The lug 74 extends in a tongue 80 laterally from the end of the wire clamp 66 to provide placement of the wire clamp 66 as will be described below. A substantially identical latching assembly 82 to the latching assembly 32 of the identification block 10 is employed with the wire clamp 66. The latching assembly 82 includes a latch 84 pivoted about a pin 86 extending across a groove 88 in the upper jaw 68. A biasing spring 90 biases the latch 84 into the locked position as shown in FIG. 2.

To clamp wires between the jaws 68 and 70, cavities are provided in each mating surface of the jaws 68 and 70 for receiving resilient clamping elements 92 and 94. These clamping elements 92 and 94 may be of a resilient rubber or plastic material. Polyurethane is employed in the preferred embodiment. The resilient clamping elements 92 and 94 are of sufficient thickness to provide resiliency for the clamping of wires therebetween. However, they must also provide sufficient compressive resistance against the wires positioned therebetween to prevent longitudinal movement of the individual wires during a stripping of the insulation from one end. The width of the resilient clamping elements 92 and 94 is intended to be sufficient for the clamping of the entire fan developed in using the corresponding identification block 10. Channels 96 and 98 are cut from either jaw 68 and 70 to provide unobstructed passage of the wires into and away from the resilient clamping elements 92 and 94.

The identification block 10 of FIG. 1 and the wire clamp 66 of FIG. 2 are designed to be positioned side by side as seen in FIGS. 3 and 4. A locating pin 100 is provided through the upper jaw 68 of the wire clamp 66. The pin 100 extends from the surface adjacent the identification block 10 and is received by hole 102 extending through the upper member 12 of the identification block 10. The identification block 10 and the wire clamp 66 are also retained relative to one another by the wires which extend through each mechanism. The cooperation between the wire clamp 66 which tightly retains the wires and the identification block 10 which allows free longitudinal movement of the wires through the terminal sleeves makes it possible for the wires to be fixed relative to the identification block 10 when tensile loadings are placed on the ends of the wires extending from the back side of the identification block 10. At the same time, the identification block 10 may be moved directly away from the wire clamp 66 such that the terminal sleeves will wipe toward the end of the wires extending therefrom.

The terminal sleeves 104 are, in the present preferred embodiment, of heat shrinkable material formed into substantially cylindrical hollow tubes. In the present embodiment, the terminal sleeves 104 are transiently adherent to a tape 106. The tape 106 simply extends across the surface of the lower rectangular recess 46 as seen in FIGS. 4 and 5. The loading of the terminal sleeves 104 in this manner greatly facilitates the operation of the identification block 10 in that individual placement of each terminal sleeve 104 is not required. Naturally, other configurations for holding the terminal sleeves 104 in a cassette are also applicable to the present invention. Specific channels and recesses may be provided for such cassettes in either the upper or lower member of the identification block 10 where the cassette cannot fit within the space provided in the present embodiment.

The terminal sleeves 104 are generally substantially cylindrical in shape and are hollow to receive the wires. In a preferred embodiment, the terminal sleeves 104 are made of heat shrinkable material and are provided in an expanded state. A cylindrical ring of solder 108 is preferably employed in the terminal sleeves 104 of the present invention. In this way, a hot air gun or other heating source may be employed to both shrink the terminal sleeves 104 and melt the solder 108 about a wire terminal as will be later discussed. Such heat shrinkable terminal sleeves 104 including solder rings are disclosed in Wetmore, U.S. Pat. No. 3,243,211, the disclosure of which is incorporated herein by reference.

The procedure for properly conditioning and placing a plurality of wires for assembly with a multi-pin connector employs the identification block 10 and the wire clamp 66. The identification block 10 is first loaded with a plurality of terminal sleeves 104. The terminal sleeves are positioned within the lower rectangular recess 46 adjacent the front wall 48 thereof. The upper member 12 is then closed and is held by the latch assembly 32. The terminal sleeves 104 may be inspected during closure of the upper member 12 to insure that the terminal sleeves 104 properly meet with the scalloped ridge 56. Once the upper and lower members 12 and 14 are locked together, sufficient resistance between the terminal sleeves 104 and the scalloped ridge 56 exists to prevent longitudinal motion of the terminal sleeves relative to the identification block 10. The terminal sleeves are positively prevented from moving forward relative to the identification block because of the front wall 48 of the recesses.

Once the terminal sleeves 104 are positioned within the identification block 10 and the proper wire identification card 58 is assembled with the identification block 10, a partially stripped cable 110 may be positioned in front of the identification block 10 and the appropriate wires 112 threaded through the channels 50 corresponding with similarly coded wires 64. By positioning the wires 112 through the channels 50, the wires also pass through individual terminal sleeves 104. A wire fan as depicted in FIG. 3 will be formed. It is not important that the wires be of uniform length at this time. Consequently, any convenient length or lengths may be employed that will pass well through the identification block 10. Further, the wires need not be stripped at this time. If the wires are not stripped, the wires will not fray and buckle. This is the only time in the termination process when the ends of the wires are subjected to compressive longitudinal loading. Consequently, after the wires are cut and stripped they will not be subjected to fraying and buckling.

Once the wires are properly positioned through the identification block 10, the wires 112 are pulled tight and the wire clamp 66 is employed. The wire clamp 66 may be positioned adjacent the identification block 10 while open. In this way, the locating pin 100 may be inserted in the hole 102 in the identification block 10 without disturbing the wire fan. Once positioned with the identification block 10, the wire clamp 66 may be closed and locked by means of the latch assembly 82. Once both the identification block 10 and the wire clamp 66 are locked, the wires 112 are unable to move relative to the wire clamp 66 and can move only longitudinally relative to the identification block 10. Further, because the clamp 66 rests against the identification block 10, the wires are unable to move longitudinally through the identification block 10 toward the back side thereof. On the other hand, the wire clamp 66 and the wires 112 may be moved forward away from the identification block 10.

Once the wires 112 are held by the identification block 10 and the wire clamp 66, the ends of the wires 112 may be conditioned for assembly with a multi-pin connector. The positioning of the wires 112 through the identification block 10 is accomplished before the wires 112 are conditioned by cutting and stripping. Once positioned as shown in FIG. 3, the individual wires 112 may be conditioned for assembly with a multi-pin connector by cutting the wires at a first distance from the identification block and the sleeves positioned therein. The wires are typically cut in a straight line. Such a uniform cut may be taken along line 114 of FIG. 3. Following the uniform cutting of the wires 112, the wires must be stripped of a length of insulation. This may be accomplished by individually stripping the wires 112 or by using a stripper designed to strip many wires at one time. Again, one such cutter-stripper is disclosed in the copending application of Meadows for a Wire Cutter-Stripper Ser. No. 442,398, filed Feb. 14, 1974, the disclosure of which is incorporated herein by reference. Because the wire clamp 66 prevents the wires 112 from moving longitudinally through the identification block 10 in a direction away from the cable 110, the wires can be stripped by cutting and pulling the insulation from the end of the wire. The tension induced in the wires 112 by the stripping operation is resisted by the wire clamp 66 which is held by the identification block 10. In order that the wires 112 can be stripped, the identification block 10 must be held so as not to move with the stripper blades.

Once conditioned, the wires 112 appear as illustrated in FIGS. 4 and 5. At this time, the wires 112 may be located for assembly with a multi-pin connector. The present invention allows the positioning of the conditioned wires 112 without requiring their removal from the identification block 10. Thus, the tedious task of indexing the wires a second time to meet the proper connector pins is not required. The positioning of the conditioned wires 112 relative to a multi-pin connector is illustrated in FIG. 6. FIG. 6 illustrates a sophisticated guide means for positioning the wires 112 and sliding the terminal sleeves 104 onto connector pins. Naturally, a more rudimentary guide system may be employed.

The guide means, generally designated 116 includes a base 118, a connector clamp 120 bolted thereto by means of fasteners 122 and a plurality of guides for positioning the identification block 10 and the wire clamp 66. Wire clamp guides 124 and 126 are fixed relative to the base 118. The wire clamp 124 includes a slot 128 for receiving the wire clamp tongue 80. The slot 128 is terminated to vertically position the wire clamp 66 within the wire clamp guide slot 128. At the other end of the wire clamp 66, the wire clamp guide 126 provides a locking tongue 130 receiving the extended notch 88 of the wire clamp 66. The locking tongue 130 terminates in a broader base positioned below the extensions of the wire clamp 66 to vertically position the wire clamp 66 on the locking tongue 130. In this way, the wire clamp 66 is locked relative to the base 118 yet is supported at an elevated position above the surface of the base 118.

The identification block 10 is similarly associated with identification block guides 132 and 134. A slot 136 is provided to receive the locating tongue 24 of the identification block 10. The identification block guide 134 includes a locating tongue 138 for cooperating with the identification block notch 30. A support block 140 positions the identification block 10 vertically relative to the locating tongue 138 and includes a pin 141 which cooperates with a hole on the underside of the lower member 14 to prevent motion of the lower member 14 when the upper member 12 is opened. Unlike the wire clamp guides 124 and 126, the identification block guides 132 and 134 are located on a horizontal beam 142 which is slidably mounted to the guide means base 118. The horizontal beam 142 is positioned to slide on raised slide pads 144 near either end thereof. The slide pads 144 are preferably of a low friction, high wear material. Centrally located beneath the horizontal beam 142 is a driving member 146. The driving member 146 is fixed to a bushing which rides on a shaft (not shown) which is parallel to the slide pads 144. A lever 148 extends across the base 118 in a cavity provided therefor. The lever 148 is pivotally mounted to the driving member 146 and continues to a pivot point on the far side of the base 118. By moving the lever 148 to and fro, the horizontal beam 142 will be moved parallel to the slide pads 144. This will in turn cause the identification block 10 to move toward or away from the wire clamp 66.

A multi-pin connector 150 is illustrated in position in the connector clamp 120. Multi-pin connectors 150 typically have ears 152 extending from either end thereof. These ears 152 are held by the connector clamp 120 in slots 154. A compression clamp 156 forces the multi-pin connector 150 against the opposite side of each of the slots 154. The slots 154 are slightly larger than the ears 152 on the multi-pin connector 152. This allows easy placement of the multi-pin connector 150 and provides some resiliency to the system when the identification block 10 is run against the multi-pin connector 150. In the depicted embodiment, the multi-pin connector 150 includes two rows of closely spaced connector pins 158.

Figure 7:
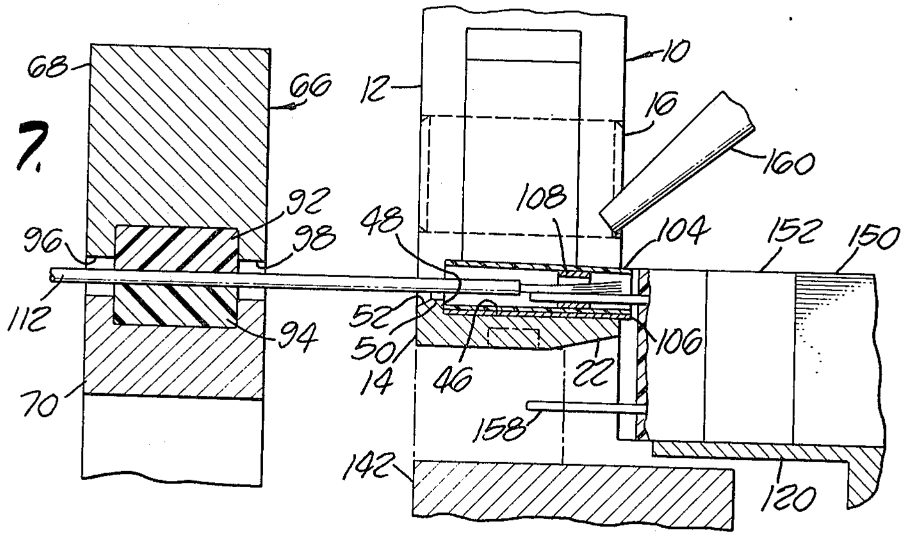
FIG. 7 is a cross-sectional side view taken along line 7—7 of FIG. 6 with the upper member of the identification block rotated out of the way.

When positioning the identification block 10 and the wire clamp 66 with the wires 112 on the guide means 116, the identification block 10 and the wire clamp 66 are held together. The lever 148 is moved to a position such that the horizontal beam 142 and correspondingly the identification block guides 132 and 134 are positioned adjacent the wire clamp guides 124 and 126. The identification block 10 and the wire clamp 66 may then be easily positioned on the tongues and slots associated with the guide means 116. In cutting the wires 112 to length, it is advantageous that the relative dimensions of the guide means be kept in mind. Specifically, when the wires 112 are properly cut to length when the identification block and the wire clamp 66 are positioned on the guide means 116, the ends of the wires will be capable of being in juxtaposition with the appropriate connector pins 158. This spacing is illustrated in FIG. 7. When first positioned on guide means, it is not important that the wires 112 be straight in order that they lead directly to the appropriate connector pin 158. However, the wires 112 should, when straightened, be positioned with the stripped portion of the wire 112 immediately adjacent the appropriate connector pin 158.

Once the wires, identification block and wire clamp are positioned, the lever 148 may be moved to draw the identification block 10 away from the wire clamp 66. Because the wire clamp 66 holds the wires 112 firmly, the identification block 10 will move relative to the wires 112 toward the multi-pin connector 150. By properly dimensioning the identification block 10, the guide means 116 and the multi-pin connector 150, the movement of the identification block 10 will be such, under the influence of the lever 148, that the terminal sleeves 104 will slid along the individual wires 112 onto the approproate connector pins 158. Such a condition is illustrated in FIG. 7. Thus, regardless of the condition of the stripped wires 112, they will be wiped into straight paths leading directly to the appropriate connector pins 158. Accordingly, with one simple motion of the lever 148, the wires 112 are straightened and indexed to the appropriate connector pin 158. Further, the terminal sleeve 104 is caused to be positioned over the juxtaposed wire and connector pin. The tedious, repetitive and often improper indexing and soldering individually of the various connector pins is thereby avoided.

In the present embodiment, the terminal sleeves 104 are both heat shrinkable and contain a solder ring 108. Consequently, once the terminal sleeves 104 are positioned over the juxtaposed wires 112 and connector pins 158, the upper member 12 of the identification block 10 may be raised, exposing the terminal sleeves 104. A hot air gun 160 may then be used to heat the terminal sleeves 104 to a temperature which will both shrink the heat shrinkable material about the wire 112 and connector pin 158 and melt the solder ring 108 in order that it might flow to create a soldered connection. The lower member 14 of the identification block 10 acts as a heat reflector to aid the shrinking and soldering process.

Once the solder and terminal sleeve have cooled, the wire clamp 66 may be unlocked and the wire clamp 66, the identification block 10, the multi-pin connector 150 and the now associated wires 112 may be removed from the guide means 116. The several steps outlined above may then be repeated for a second set of wires 112. These wires may then be associated with the second row of closely spaced connector pins 158 using the guide means 116. It can be seen in FIG. 7 that both the wire clamp 66 and the identification block 10 are held in the guide means in such a way that spaces are provided beneath each of the mechanisms. The already attached wires 112 may be positioned beneath the lower jaw 70 of the wire clamp 66 and the lower member 14 of the identification block 10. The multi-pin connector 150 would be turned over for this second attaching of wires 112 thereto. Both the lower jaw 70 of the wire clamp 66 and the lower member 14 of the identification block 10 are relatively thin in order that they may fit between the two rows of wires 112 leading to the two rows of connector pins 158. Again, once the wires 112 are associated with the second row of connector pins 158, the hot air gun 160 may be used to shrink the terminal sleeves 104 and melt the solder rings 108 to complete the assembly of the individual terminals. Once completed, the wire clamp 66 and the identification block 10 are slid from between the two rows of wires 112. At this time, the operator would start over with a new cable, cartridge of terminal sleeves 104 and multi-pin connector 150.

Thus, a method is disclosed which provides for the conditioning and placement of a plurality of wires resulting in the simultaneous assembly of a terminal. In this way, the assembly of terminals can be accomplished more inexpensively with greater accuracy and reliability.

While thus far predominant emphasis has been placed upon the preferred embodiment of this invention, in which terminal sleeves are employed to effect terminations of plural wires to multi-pin connectors, it will be appreciated that the invention is applicable to numerous other employments. For one, the identification block may serve, without terminal sleeves, as a spacing member to bring stripped wire ends into juxtaposition with the pins to which they are to be terminated, whereafter the juxtaposed elements can be bared and a permanent termination otherwise made, as with a soldering gun. Indeed, the invention can be employed to effect terminations to many conductive elements other than the pins of connectors, e.g., terminal posts borne by electronic devices, etc. Again, the invention may be employed to splice the ends of individual wires, one to another, simply by passing wires intended for spliced joinder through individual ones of the passages through the spacer member or through terminal sleeves disposed in an identification block, cutting and stripping the ends as before, and moving the spacing member relative to the wires toward their stripped ends so as to bring into juxtaposition the stripped ends of those wires disposed in a single passage of spacer block. If so juxtaposed within the passages, the spacer block may then be opened and, by whatever means, a permanent splice effected. Alternatively, the spacer block may be moved only so far forward the stripped ends of the wires as to permit their ready identification as ends intended for connection, one to another, whereafter the ends may be connected in any conventional fashion. Of course, as will be apparent to those skilled in the art from the foregoing, disposition of plural wires within a single passage through the identification or spacing block is not limited in application to the formation of splices, etc. Thus, for example, plural wires can so be terminated to single conductive elements.

It will be apparent to those skilled in the art that many more modifications are possible without departing from the inventive concepts herein described. The invention, therefore, is not to be restricted except by the spirit of the appended claims.

We claim:

1. A method for the termination of a plurality of wires to a plurality of conductive elements including the steps of threading a plurality of wires through a plurality of terminal sleeves retained in fixed positions relative to one another;

cutting the ends of the wires extending from the terminal sleeves at a first distance from the terminal sleeves;

stripping a length of insulation from the ends of each of the wires extending from the terminal sleeves;

positioning the wires such that the stripped ends are capable of juxtaposition with individual elements to which they are to be terminated; and sliding the terminal sleeves relative to said elements simultaneously on to said elements while maintaining the position of the wires relative to said elements to juxtapose selectively the stripped ends of the wires with said elements for the termination of the wires to said elements in terminal sleeves.

2. The method of claim 1 wherein the step of cutting the wires includes a single cutting of all of the wires in a straight line.

3. The method of claim 1 wherein the step of stripping a length of insulation from the end of each of the wires is performed simultaneously for all of the wires.

4. The method of claim 1 wherein the method further includes the step of positioning a plurality of terminal sleeves such that they are oriented substantially parallel to one another in a row.

5. The method of claim 4 wherein the step of positioning the terminal sleeves includes their positioning such that they may be fed directly onto said conductive elements without reorienting the terminal sleeves relative to one another.

6. The method of claim 1 wherein the method further includes the step of clamping the wires such that they may move longitudinally through the terminal sleeves in only one direction.

7. The method of claim 1 wherein the method further includes the step of fixing permanently the terminal sleeves about the juxtaposed wires and conductive elements.

8. The method of claim 7 wherein the fixing permanently of the terminal sleeves is accomplished by heat shrinking the terminal sleeves about the juxtaposed wires and conductive elements.

9. The method of claim 7 wherein the step of fixing permanently the terminal sleeves includes the melting of a solder ring within each of the sleeves and allowing that ring to cool to form a completed termination.

10. The method of claim 1 wherein said conductive elements are the pins of a multi-pin connector and wherein the steps are repeated for a second row of connector pins located on the multi-pin connector.

11. A method for effecting a plurality of splices of plural wires, one to another, including the steps of disposing at least two of said wires in each of a plurality of substantially parallel, spaced apart passages located through a spacing member, free ends of each of said wires extending beyond said member;

cutting the extended ends of said wires at a first distance from said member;

stripping a length of insulation from the extended ends of each of the wires; and moving said spacing member relative to said wires toward the stripped ends thereof so as to bring into juxtaposition the stripped ends of each of those wires disposed in a single passage.

12. A method for the termination of a plurality of wires to a plurality of conductive elements including the steps of individually disposing said wires in individual ones of a plurality of substantially parallel, spaced-apart passages through a spacing member, free ends of said wires extending beyond said member;

cutting the extended ends of said wires at a first distance from said member;

stripping a length of insulation from the extended ends of each of the wires;

positioning said spacing member so as to align said passages with individual ones of said conductive elements; and moving said spacing member relative to said wires toward said elements to selectively juxtapose the stripped ends of the wires with those conductive elements aligned with the respective passages in which said wires are disposed.

* * * * *